United States Patent [19]

Meyer et al.

[11] 4,241,031
[45] Dec. 23, 1980

[54] DISSOLUTION OF NICKELIFEROUS SULFIDE MATERIAL IN HCL

[75] Inventors: Gustavo A. Meyer; John R. Carlberg, both of Arvada, Colo.; Cvetko Nikolic, Harvey, La.

[73] Assignee: Amax Inc., Greenwich, Conn.

[21] Appl. No.: 12,781

[22] Filed: Feb. 16, 1979

[51] Int. Cl.³ .............................................. C01G 53/08
[52] U.S. Cl. .................................. 423/150; 423/47; 423/48; 423/154; 75/6; 75/119
[58] Field of Search ................... 423/150, 153, 154; 75/119; 204/113

[56] References Cited

U.S. PATENT DOCUMENTS

| | | | |
|---|---|---|---|
| 940,292 | 11/1909 | Wells | 423/150 |
| 1,044,316 | 11/1912 | Wells | 423/150 |
| 1,266,775 | 5/1918 | Dhavernas | 75/119 |
| 1,756,092 | 4/1930 | Lathe | 423/150 |
| 2,223,239 | 11/1940 | Hamprecht | 75/119 |
| 2,239,626 | 4/1941 | Schlecht | 423/150 |
| 2,753,259 | 7/1956 | Schlecht | 75/119 |
| 3,085,054 | 4/1963 | Thornhill | 204/113 |
| 4,067,952 | 1/1978 | Pittie | 423/150 |

OTHER PUBLICATIONS

Thornhill, "The Falconbridge Matte Leach Process", *Journal of Metals*, Jul., 1971, pp. 13–18.

*Primary Examiner*—Brian E. Hearn
*Attorney, Agent, or Firm*—Michael A. Ciomek; Eugene J. Kalil

[57] ABSTRACT

A process is provided for leaching nickeliferous sulfide material, such as NiS precipitate and thermally activated nickel sulfide material, e.g., nickel matte, the process comprising subjecting nickeliferous sulfide material in the finely divided state to leaching in hydrochloric acid of concentration ranging from about 3 N to 8 N at a temperature of over 50° C., the temperature and acid concentration being selected to dissolve at least about 50% by weight of the total contained nickel.

35 Claims, 8 Drawing Figures

DISSOLUTION OF NICKELIFEROUS SULFIDE MATERIAL IN HCL

This invention relates to the recovery of nickel from nickeliferous sulfide material by dissolution with hydrochloric acid, for example, the recovery of nickel from nickel sulfide precipitate obtained in the leaching of lateritic ores and from nickeliferous sulfide material which has been thermally treated.

STATE OF THE ART

It is known to recover nickel from copper-nickel matte by leaching with hydrochloric acid, one such process being disclosed in U.S. Pat. No. 3,085,054 Apr. 9, 1963). An object of the process described in the patent is to separate nickle from copper-nickle Bessemer matte to produce a nickel product in a highly purified form (e.g., nickel chloride) and a copper sulfide residue substantially free from nickel and containing platinum metals, the nickel chloride leach solution being thereafter purified by ion exchange and/or solvent extraction.

According to the patent, the Bessemer matte in the finely divided state is mixed with a stoichiometric excess of relatively concentrated hydrochloric acid to form a reacting solution evolving hydrogen sulfide. The HCl concentration employed is generally over 6 N. e.g., 7 to 9 N, depending upon the nickel content, in order to promote maximum conversion of cobalt ions present in the leach solution to negatively charged complexes conductive to the subsequent removal of cobalt by an ion exchange resin of the strongly basic quaternary amine type.

Thus, in the leaching of a Bessemer matte containing 20.45% Cu, 48.18% Ni, and 20.55% S, in addition to small amounts of Fe, Co, Pb, and As, a concentration of 7.6 N HCl is disclosed as the acid leach solution at a temperature of about 65° C. using a four vessel cascade for about 11 hours. The reacted mixture is continuously withdrawn from the last vessel of the cascade and filtered to provide a residue comprising substantially copper sulfide and a 5.2 N HCl pregnant solution containing 92 gpl (grams per liter) nickel, over 99% of the nickel being extracted. The nickel solution is subsequently purified of impurities using either an ion exchange column and/or solvent extraction techniques.

The foregoing nickel-copper matte is characteristic of products obtained in the pyrometallurgical treatment of nickel-copper ores. An advantage of working with such ores is that they can be easily concentrated by such conventional techniques as froth flotation, magnetic separation, and the like, prior to pyrometallurgically smelting the concentrate into a nickel-copper matte.

Nickel is also found, generally with small amounts of cobalt, in various parts of the world as a low copper nickeliferous oxide ore, such as nickeliferous limonites and nickeliferous silicates. However, such ores are not amenable to the aforementioned conventional concentration techniques and, therefore, are at an economic disadvantage compared to sulfide ores.

A known process for recovering nickel and cobalt from nickeliferous oxide ores is the Moa Bay leaching process practiced in Cuba. This process comprises pulping minus 20 mesh nickel ore (95% passing 325 mesh) to approximately 45% solids, and then selectively leaching the nickel and cobalt with sufficient sulfuric acid at elevated temperature and pressure (e.g., 230° to 260° C. and 405 to 680 psig) to solubilize about 95% each of the nickel and cobalt in about 60 to 90 minutes. The leached pulp is cooled and then washed by countercurrent decantation, with the washed pulp going to tailings. The acid pH, which is quite low (e.g., less than 1), is then neutralized with coral mud to a pH of about 2.4 in a series of four tanks at a total retention time of about 20 minutes and the thus-treated product liquor (containing about 5.95 gpl Ni, 0.8 gpl Fe, and 2.3 gpl Al) is then subjected, after solid-liquid separation, to sulfide precipitation by preheating the leach liquor and carrying out the precipitation with $H_2S$ in an autoclave at about 120° C. (250° F.) and a pressure of about 150 psig. Usually, nickel sulfide seed is added at the feed end to assure substantially complete precipitation of the nickel and cobalt. The nickel sulfide precipitate is a primary nickel sulfide in which the S/Ni atom ratio is approximately 1.

After the sulfide precipitate has been washed and thickened to about 65% solids, it is oxidized in an autoclave at about 177° C. (350° F.) and a pressure of about 700 psig. The solution of solubilized nickel and cobalt is neutralized with ammonia to a pH (5.35) sufficient to precipitate any residual iron, aluminum, and chromium present using air as an oxidant, the precipitate being thereafter separated from the solution. The nickel and cobalt solution is thereafter adjusted in pH to about 1.5 and $H_2S$ added to precipitate selectively any copper, lead, and zinc present, which precipitate is separated from the solution by filtration. The nickel is then selectively recovered from the solution by various methods, one particular method comprising treating the solution in an autoclave with hydrogen at a pressure of about 650 psig at a temperature of about 245° C. (375° F.) using nickel powder as seed material.

A disadvantage of the foregoing process is the high energy costs necessitated by the use of elevated temperatures and pressures and special autoclave equipment for treating the nickel sulfide precipitate obtained in the process in order to recover effectively the nickel and cobalt therefrom.

It would be desirable to provide a leaching process for treating low-copper nickeliferous sulfide material (e.g., copper ranging up to about 5% by weight) capable of being carried out at ambient pressure and at a temperature ranging up to boiling, the nickel sulfide material being one in which the sum of the nickel, sulfur, and optionally the cobalt content is at least about 85% by weight of the material, especially nickeliferous sulfide material in which the S/Ni atom ratio ranges broadly from about 0.3:1 to as high as about 2:1. As has been stated, primary nickel sulfide precipitate has a S/Ni atom ratio of approximately 1. This sulfide has been observed to exhibit different leaching properties from other nickel sulfide materials, such as nickeliferous sulfide materials containing substantial amounts of $NiS_2$, $Ni_3S_4$, $Ni_7S_6$, $Ni_3S_2$, etc.

It has also been observed that certain nickel sulfide materials are more active than others. This is particularly the case with nickel sulfide material deficient in sulfur. Such materials, depending upon their average particle size, tend to present the problem of foaming during leaching, particularly where the sulfide material is very finely divided. Foaming can have an adverse effect on the efficiency of the overall leaching process due to a natural flotation action in which the finely divided sulfides are occluded in the foam which contaminates the gas effluent with solids which collect in and block up the piping through which the gas effluent is conducted.

It would thus be desirable to provide an acid leaching process capable of leaching low-copper nickeliferous sulfide material having a relatively broad sulfur range and in addition, as a further embodiment, an acid leaching process capable of treating highly active nickeliferous sulfide material while inhibiting substantial foaming during the initial stages of leaching.

OBJECTS OF THE INVENTION

It is an object of the invention to provide a process for recovering nickel from low-copper nickeliferous sulfide material using a hydrochloric acid as the leaching solution.

Another object is to provide a process capable of leaching nickeliferous sulfide material having a sulfur content corresponding to a S/Ni atom ratio ranging broadly from about 0.3:1 to 2:1.

A further object of the invention is to provide a hydrochloric acid leaching process for leaching finely divided thermally activated nickeliferous sulfide material using a low temperature leach to effect substantial dissolution of the material while inhibiting foaming and subsequently a higher temperature leach to complete substantially the leaching of the matte.

A still further object of the invention is to provide a hydrochloric acid leaching process for thermally activated nickeliferous sulfide material comprising a multi-stage, low temperature leaching step followed by a multi-stage, high temperature leaching step downstream thereof.

These and other objects will more clearly appear when taken in conjunction with the following disclosure and the accompanying drawings, wherein:

STATEMENT OF THE INVENTION

It has been found according to the invention that low-copper nickeliferous sulfide material can be efficiently leached over a relatively broad range of sulfur content despite the form of the sulfide material, be it a primary nickel sulfide material, thermally activated nickel sulfide, or a difficult-to-leach or refractory sulfide residue containing relatively high sulfur, e.g., a residue in which the S/Ni atom ratio is over 1 and ranges up to about 2:1 or higher.

The invention is applicable to low-copper nickeliferous sulfide materials in which the sum of the nickel, sulfur and optionally cobalt contents is at least about 85% of the total weight of the sulfide material, copper, if present, ranging up to about 5%.

The amount of sulfur may broadly correspond to a S/Ni atom ratio of at least about 0.3:1 and may range up to about 2:1 or higher. The sulfide material capable of being treated in accordance with the invention is listed under three categories as follows:

(A) a material having a S/Ni atom ratio of about 0.3 to 0.9;

(B) a material consisting essentially of a primary nickel sulfide precipitate having a S/Ni atom ratio of approximately 1; and (C) a material having a S/Ni atom ratio of over 0.9.

In category (A), such materials are deficient in sulfur compared to the S/Ni atom ratio of precipitated NiS. Usually, such materials result from the pyrometallurgical treatment of, for example, NiS precipitate. If a nickel sulfide precipitate is melted in the presence of air or oxygen, the sulfur content may be controlled to a level corresponding to a S/Ni atom ratio of about 0.3 to 0.9. The molten material is generally referred to as a matte and is preferably granulated using a cooling fluid, such as a water spray, or a stream or gas or steam, etc. The material is very active and leaches rather completely and rapidly in hydrochloric acid.

Another method of activating the primary NiS precipitate is to subject it to hydrogen reduction at a temperature within the range of about 300° C. to 600° C. to reduce the sulfur content to below a S/Ni atom ratio of 1 or in the range of 0.3:1 to 0.9:1.

In category (B), the nickel sulfide precipitate is capable of being leached, especially a fresh precipitate, with hydrochloric acid to dissolve at least about 50% by weight of the total nickel contained. However, this reaction does not proceed to completion in that it forms a sulfide residue having a relatively high sulfur content which is refractory to further dissolution, the amount of sulfur in the residue exceeding a S/Ni atom ratio of 1 and ranging up to about 2:1. However, as part of the overall process of treating the (B) material, the residue is recovered, thermally activated to reduce the sulfur at least about 10% by weight of its total sulfur content, preferably reduce it at least about 15% by weight, and advantageously to below a S/Ni atom ratio of 1 and the thermally activated residue recycled to the leaching circuit.

Category (C) relates to nickeliferous sulfide material having a sulfur content corresponding to a S/Ni atom ratio of over 0.9 and ranging up to as high as 2:1 or higher. In this instance, the material is thermally activated to reduce similarly the sulfur at least about 10% by weight of its total sulfur content, preferably reduce it at least about 15% by weight, and advantageously reduce it to a S/Ni atom ratio ranging from about 0.3 to 0.9 using thermal methods already described, among others.

Thus, stating it broadly, the invention is directed to a process for the hydrochloric acid leaching of low-copper nickeliferous sulfide material having a nickel, sulfur, and optionally cobalt content of at least about 85% by weight of said material, the method comprising selecting the nickeliferous sulfide material to be leached from the group consisting of:

(A) a material having a S/Ni atom ratio of about 0.3 to 0.9;

(B) a material consisting essentially of a primary nickel sulfide precipitate having a S/Ni atom ratio of approximately 1; and (C) a material having a S/Ni atom ratio of over 0.9; leaching the selected material in accordance with the following steps:

(I) where the material selected is (A), the material is leached as a slurry at a selected dissolution temperature of over 50° C. in a hydrochloric acid solution of a selected normality in the range of about 3 N to 8 N (e.g., about 5 N to 7 N) sufficient to dissolve at least about 50% by weight of the total nickel in the sulfide material;

(II) where the material selected is (B), the material is leached as a slurry at a selected dissolution temperature of over 50° C. in a hydrochloric acid solution of a selected normality in the range of about 3 N to 8 N (e.g., about 5 N to 7 N) sufficient to dissolve at least about 50% of the total nickel contained in the sulfide material and provide a residue in which the S/Ni atom ratio exceeds 1, the residue being thereafter recovered and thermally activated to reduce the sulfur content thereof at least about 10% by weight of the total sulfur content, and preferably reduce it at least about 15% by weight, e.g., to an S/Ni atom ratio of about 0.3 to 0.9, the activated residue being thereafter leached again as aforesaid;

(III) where the material selected is (C), it is first thermally activated to reduce the sulfur content at least about 10% by weight, and preferably reduce it at least about 15% by weight, for example, to a value corresponding to a S/Ni atom ratio of about 0.3 to 0.9 following which the activated sulfide material is leached as a slurry at a selected dissolution temperature of over 50° C. in a hydrochloric acid solution of a selected normality in the range of about 3 N to 8 N (e.g., about 5 N to 7 N) sufficient to dissolve at least about 50% of the total nickel contained in said material;

and thereafter collecting and purifying the resulting nickel chloride leach solution obtained.

Generally speaking, the leaching temperature may range from about 50° C. to boiling or, more preferably, from about 60° C. to 90° C.

Thermally activated sulfide material will generally leach to completion until a terminal HCl normality is reached ranging from about 0.5 to 5, e.g., 0.5 to 3 N, depending upon the starting normality and the amount of nickel sulfide material being leached.

It has been observed that finely divided thermally activated nickel sulfide material can be very reactive during leaching in hydrochloric acid. Where such is the case, it is preferred to carry out the leaching process in two stages: a low temperature stage, e.g., over 50° C. to about 80° C., and then a high temperature stage, e.g., in the range of over 80° C. to boiling.

As illustrative of the invention, the following examples are given:

DETAILS OF THE INVENTION

EXAMPLE 1

Figure 1:
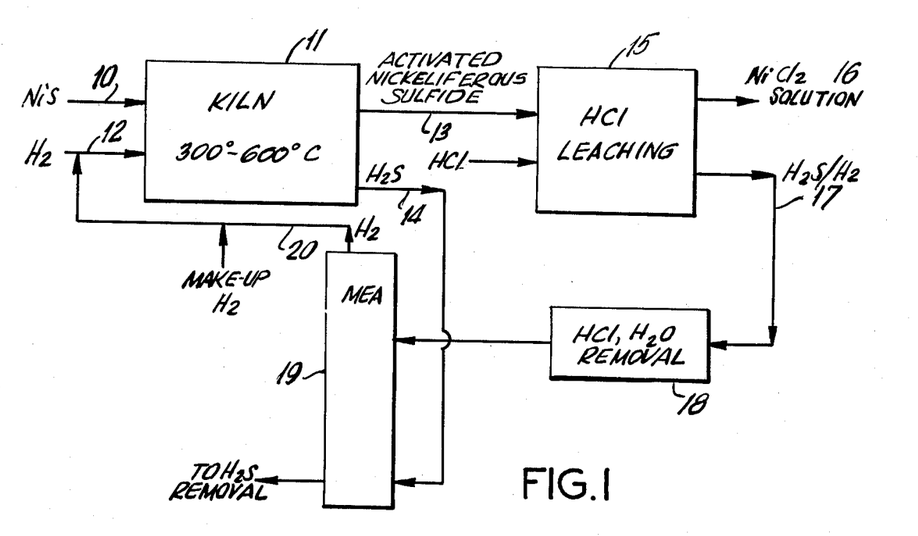
FIG. 1 is illustrative of a flow sheet of one embodiment of the invention in which a nickeliferous sulfide material comprising essentially NiS is thermally activated prior to leaching.

Referring to FIG. 1, a given weight of NiS precipitate 10 having a S/Ni atom ratio of approximately 1 is charged into reduction reactor 11 (i.e., kiln, fluid bed, etc.) maintained at a temperature in the range of about 300° C. to 600° C., e.g., 450° C., and reduced with a stream of hydrogen 12 such that the precipitate is reduced to remove approximately 10% by weight of the total sulfur content and thermally activated to provide a highly active leachable product 13 containing substantial amounts of $Ni_7S_6$ and a gaseous effluent 14 containing $H_2S$ (and containing $H_2$, $H_2O$, HCl) which $H_2S$ is recovered for recycling within the plant.

The activated nickel sulfide material (comprising approximately $Ni_7S_6$) is cooled and then leached with hydrochloric acid at leaching stage 15 at boiling temperature. As an example, 160 grams of the NiS precipitate was thermally activated at 450° C. with a hydrogen flow rate of 500 ml/min., and 87 grams of the activated material subjected to leaching in 500 ml of HCl of approximately azeotropic composition (about 6 N) for about one hour at 70° C. followed by 5 hours at boiling conditions. Samples of reduced material at various times of reduction showed that only 0.11% of the feed material remained undissolved after 2.5 hours of thermal reduction with hydrogen.

At the completion of leaching, the solution acid (HCl) normality was 2.3 and contained 138 grams/liter of nickel (gpl) and 0.34 gpl Cu.

Referring again to FIG. 1, following leaching at leach stage 15, a nickel chloride solution 16 is formed and a gaseous effluent 17 of $H_2S$ and $H_2$ produced which is passed to cooling and/or condensing means 18 for removing retained HCl, $H_2O$ vapors, the cleaned gaseous effluent being thereafter directed to an absorption tank (MEA) 19 containing monoethanolamine or other organic amine selective to the absorption of $H_2S$. The hydrogen gas passes on through and exits at 20 for recycle together with any make-up hydrogen to reactor 11. Subsequently, the absorbed $H_2S$ is separated from the organic amine and recycled where needed. The regenerated monoethanolamine is recycled into the process.

EXAMPLE 2

Another method of thermally activating NiS precipitate is to melt the precipitate in an oxidizing atmosphere to remove sulfur to a level corresponding approximately to $Ni_3S_2$ and form a matte. Approximately 25% of the total sulfur is removed from the precipitate. It is usually preferred to granulate the molten matte by rapid cooling and grind it to optimize further its solubility rate.

The generalized reaction is as follows:

$$3NiS + O_2 \xrightarrow{\Delta} Ni_3S_2 + SO_2$$

The leaching reaction is given below:

$$Ni_3S_2 + 6HCl \rightarrow 3NiCl_2 + 2H_2S + H_2$$

Figure 7:
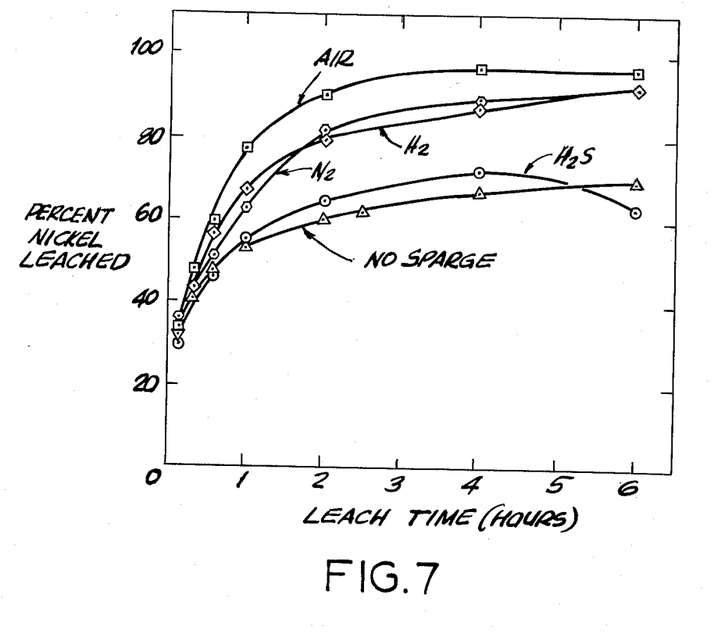
FIG. 7 depicts the effect of various sparge gases during leaching on leaching effectiveness as affected by time.

In order to carry out the leaching process to completion, it is important that the $H_2S$ be removed as it forms during the reaction. This can be accomplished by sparging the solution with such gases as steam, hydrogen, nitrogen, or air. The effect of sparging is shown in FIG. 7 in which the results are shown for leaching nickel matte with 6 N HCl at 70° C.

Figure 2:
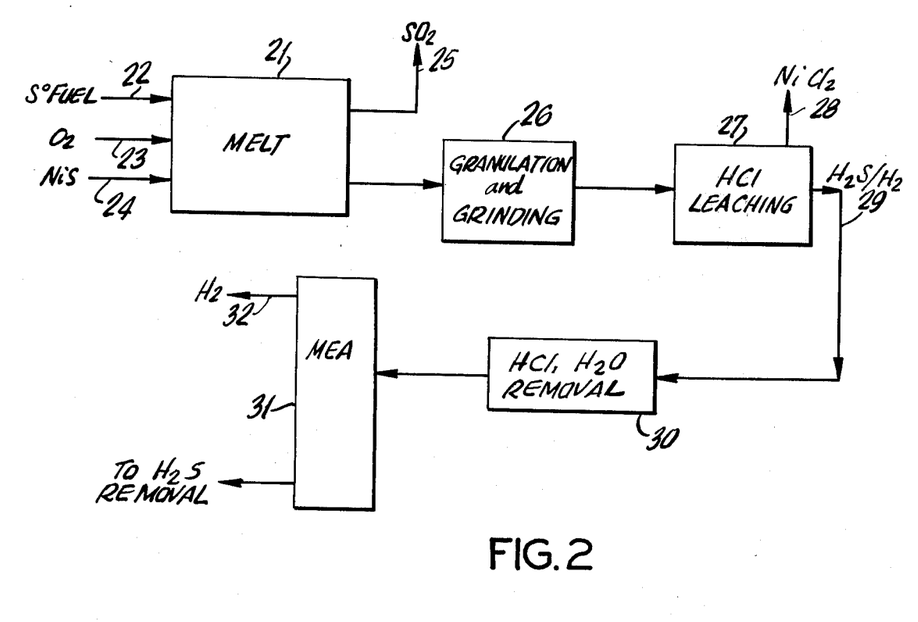
FIG. 2 is similar to FIG. 1 except that a different method is illustrated for thermally activating the NiS material.

One embodiment for carrying out the foregoing process is illustrated in the flow sheet of FIG. 2. Primary NiS precipitate 24 is melted in a furnace 21 using sulfur 22 or other suitable fuel as the heat source. Since sulfur may be a by-product of the overall process, it would be economically advantageous to use sulfur as a fuel. Air or oxygen 23, the precipitate and sulfur are fed into the furnace to remove sulfur to a level within the S/Ni range (atom ratio) of about 0.3 to 0.9. The $SO_2$ effluent 25 formed may be used to produce sulfuric acid.

The melted precipitate or matte is granulated at 26 by rapid cooling and then ground prior to leaching at 27 with approximately 6 N HCl in the range of about 65° C. to boiling using a two-stage leaching system (a low temperature stage and a high temperature stage) to form a $NiCl_2$ solution 28 which is removed and purified, the $H_2S$-$H_2$ gaseous effluent 29 formed being drawn off and subjected to HCl and $H_2O$ removal at 30 and the cleaned effluent passed through MEA solution 31 (monoethanolamine) to absorb $H_2S$ while allowing free hydrogen to pass on through the solution column and to exit at 32 where it is collected for use in the plant system. The $H_2S$ is subsequently stripped from the MEA solution and the regenerated MEA solution recycled into the process.

In accordance with the aforementioned flow sheet, a run was made starting with minus 100 mesh of 83.1 grams of nickel matte (that is, matte obtained by melting as described hereinabove) containing by weight 60.3% Ni, 5.24% Co, 1.93% Fe, 0.154% Cu, 1.06% Zn, and 28.2% S. The matte was leached in 500 ml of 6 N HCl for 6 hours at boiling temperature which corresponds to steam sparging. The resulting leach liquor contained 134 gpl Ni, 11.4 gpl Co, 4.4 gpl Fe, 0.34 gpl Cu, and 4.4 gpl Zn, the final normality of the solution being 1.33. Over 95% by weight of each of the elements in the matte was extracted, the amount of nickel extracted being 97.4% and of cobalt about 98%.

The nickel matte treated indicated an average S/Ni atom ratio in the neighborhood of about 0.7 to 0.75 taking into account the sulfur combined with Co, Fe, and Zn.

EXAMPLE 3

As will be apparent, Examples 1 and 2 employ a first step in which the primary NiS precipitate is first thermally activated to reduce the sulfur content to a S/Ni atom ratio of below 1.

However, it may be desirable to leach the NiS precipitate directly to dissolve at least about 50% by weight of the contained nickel and then thereafter separate the residue in which the percent sulfur has increased to a S/Ni atom ratio of over 1 and thermally activate it for recycle into the process to complete the leaching thereof.

Figure 3:
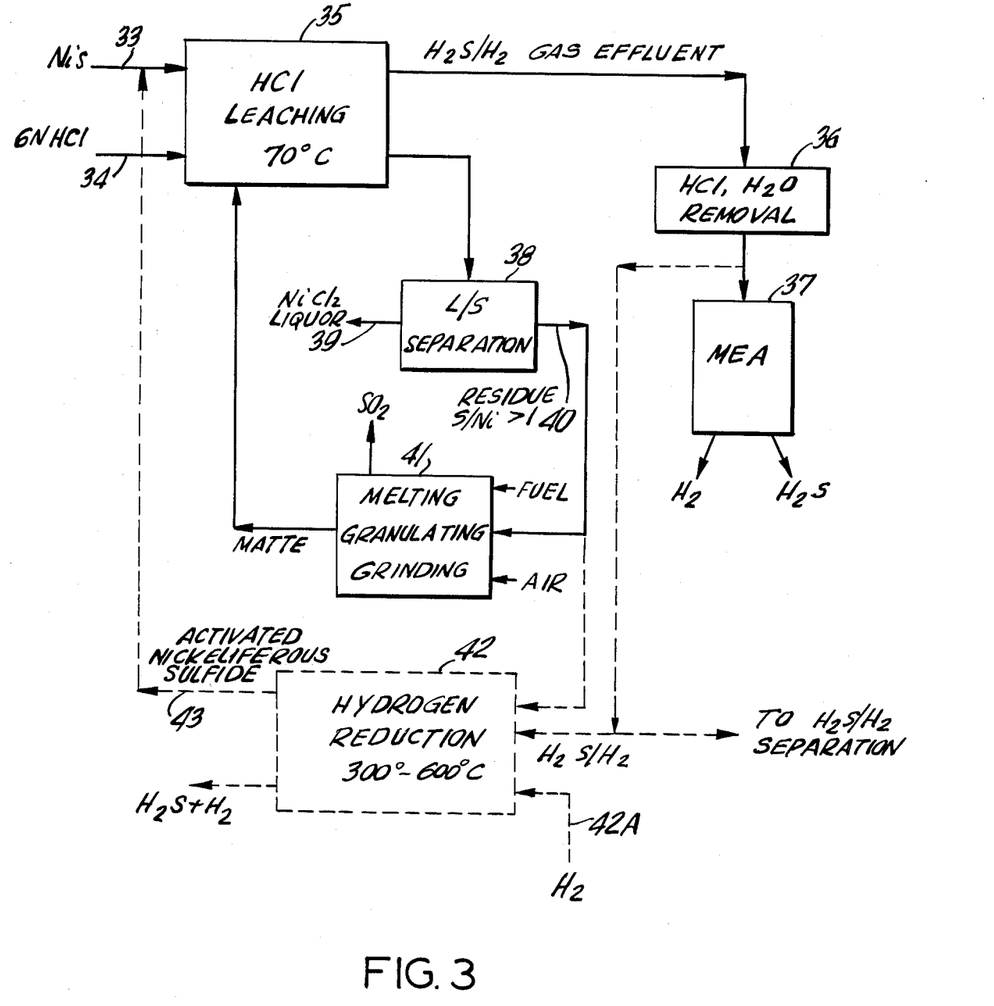
FIG. 3 is a flow sheet of another embodiment of the invention in which a nickel sulfide precipitate is first leached and the sulfide residue thereafter remaining thermally activated prior to being recycled for further leaching.

A flow sheet which may be employed, among others, is depicted in FIG. 3. During leaching, a residue forms in which the atom ratio of S to Ni is greater than 1 and which is refractory to further leaching.

Referring to FIG. 3, NiS precipitate 33 and 6 N HCl 34 are mixed at leaching stage 35 to dissolve at least about 50% of the total nickel content and produce an effluent gas comprising a mixture of $H_2S$, $H_2$, $H_2O$, and HCl. The gas effluent is subjected to HCl, $H_2O$ removal at 36 and the cleaned gas passed through MEA column 37 to remove $H_2S$ as previously described and recover free hydrogen.

The leach liquor together with the residue is passed to liquid/solid separation (L/S) 38 to provide an overflow liquor of $NiCl_2$ 39 which goes to purification and an underflow of residue 40 containing a S/Ni ratio greater than 1 and ranging up to about 2:1 is washed and dried and then fed to stage 41 for melting and granulating in the presence of air to reduce the sulfur level corresponding, for example, to $Ni_3S_2$ as described in the flow sheet of FIG. 2. The reduced residue as matte is recycled to hydrochloric acid leaching 35 to complete the dissolution thereof.

Alternatively, the residue from L/S separation 38 may be subjected to hydrogen reduction at 42 at a temperature ranging from about 300° C. to 600° C. (e.g., 450° C.) by using the gaseous effluent from HCl leaching which contains sufficient hydrogen concentration to effect the desired reduction of the residue and thermally activate it for further leaching by recycling the activated residue 43 to hydrochloric acid leaching stage 35 as shown. On the other hand, hydrogen per se (42A) may be used in place of or in addition to the $H_2S$-$H_2$ leach gases.

EXAMPLE 4

Tests were conducted in which leach residues (that is, residues obtained in the leaching of NiS precipitate) were reduced with hydrogen in a tube furnace to reduce the sulfur content by weight at least about 10%, e.g., at least about 15%. The reduced and activated material was then subjected to leaching tests under the following conditions: 6 N HCl for 6 hours at 70° C. for the first hour followed by boiling thereafter in which 91.6 grams of reduced residue were leached in 500 ml acid.

It was noted in thermally activating the residue at temperatures from about 400° C. to 450° C. at treating times ranging from about 30 to 160 minutes at a hydrogen flow rate of 500 ml/min., the percent weight loss on 216 gram samples ranged from about 14 to 17%. The samples following leaching showed a high dissolution capability ranging from about 95 to as high as 99.8% of the total weight leached.

As stated hereinbefore, where finely divided thermally activated nickel sulfide material is extremely active and tends to cause excessive foaming during the initial stage of dissolution, it is preferred that the reaction be carried out using a low temperature stage followed by a high temperature stage in order to inhibit the degree of foaming during the initial stage of dissolution.

One such embodiment comprises subjecting thermally activated nickel sulfide (e.g., nickel matte) in the finely divided granulated or comminuted state (for example, less than 50 mesh [U.S. Standard Seive]) to a low temperature leach in the range of about 50° C. to 80° C. in an HCl solution of normality ranging from about 3 N to 8 N, preferably from about 5 N to 7 N, to dissolve at least 50% by weight of the total nickel in said matte, and thereafter continuing the leaching in a high temperature leaching step in the range of about 85° C. to boiling to a terminal normality ranging from about 0.5 to 5, e.g., 0.5 to 3 N, to provide a pregnant solution containing at least about 70 gpl nickel.

Figure 4:
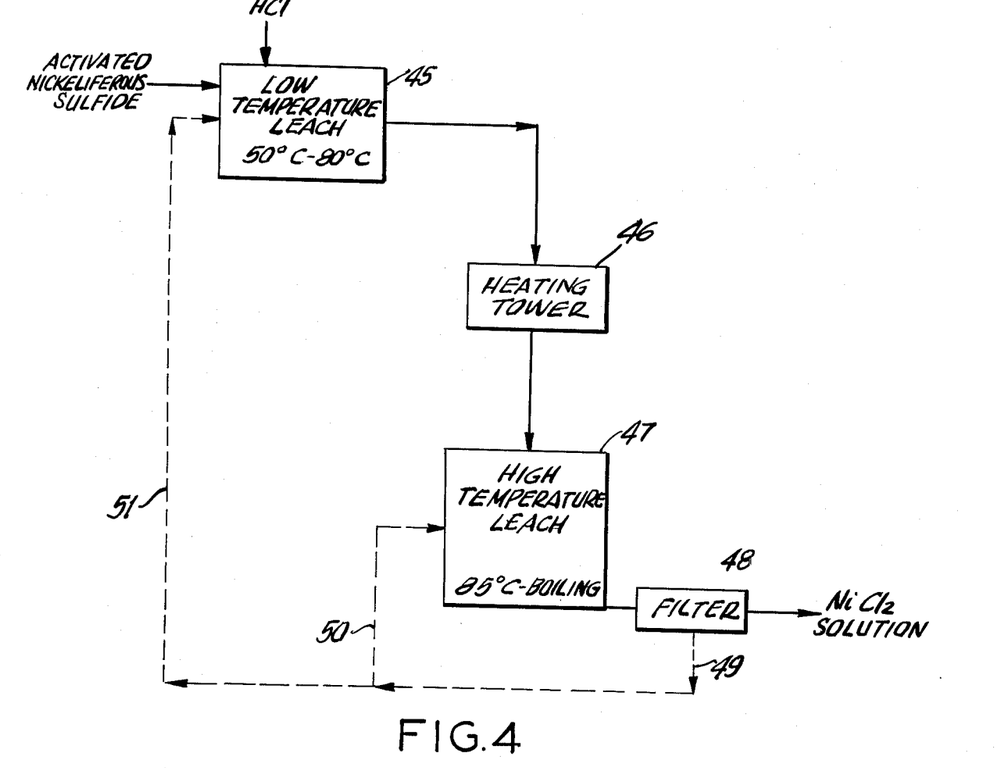
FIG. 4 is a simple flow sheet illustrating one embodiment of the invention in which a low temperature leach is coordinated with a high temperature leach downstream thereof.

A simple flow sheet illustrating the low and high leaching steps employed in carrying out the invention is shown in FIG. 4. Thermally activated nickeliferous sulfide material, e.g., nickel sulfide matte, is fed to a vessel indicated by the numeral 45 to which an azeotrope of HCl solution is fed (about 6 N), the amount of matte fed relative to the solution and the temperature selected being such as to inhibit foaming and to maximize leaching. The leaching is carried out until at least about 50% of the nickel is leached from the matte and the slurry then passed on to heating tower 46 where it is heated to a temperature in the range of about 85° C. to boiling and the heated slurry then passed on to vessel 47 where the leaching of the matte is substantially completed and the pregnant solution then passed through filter 48, the filtered nickel chloride solution going to purification to remove impurities.

Any undigested matte that remains may be recycled via lines 49, 50, or 51 to either or both of the vessels as shown.

Stage-wise addition of matte may be employed in the low temperature leach to maintain foaming to a minimum.

Figure 5:
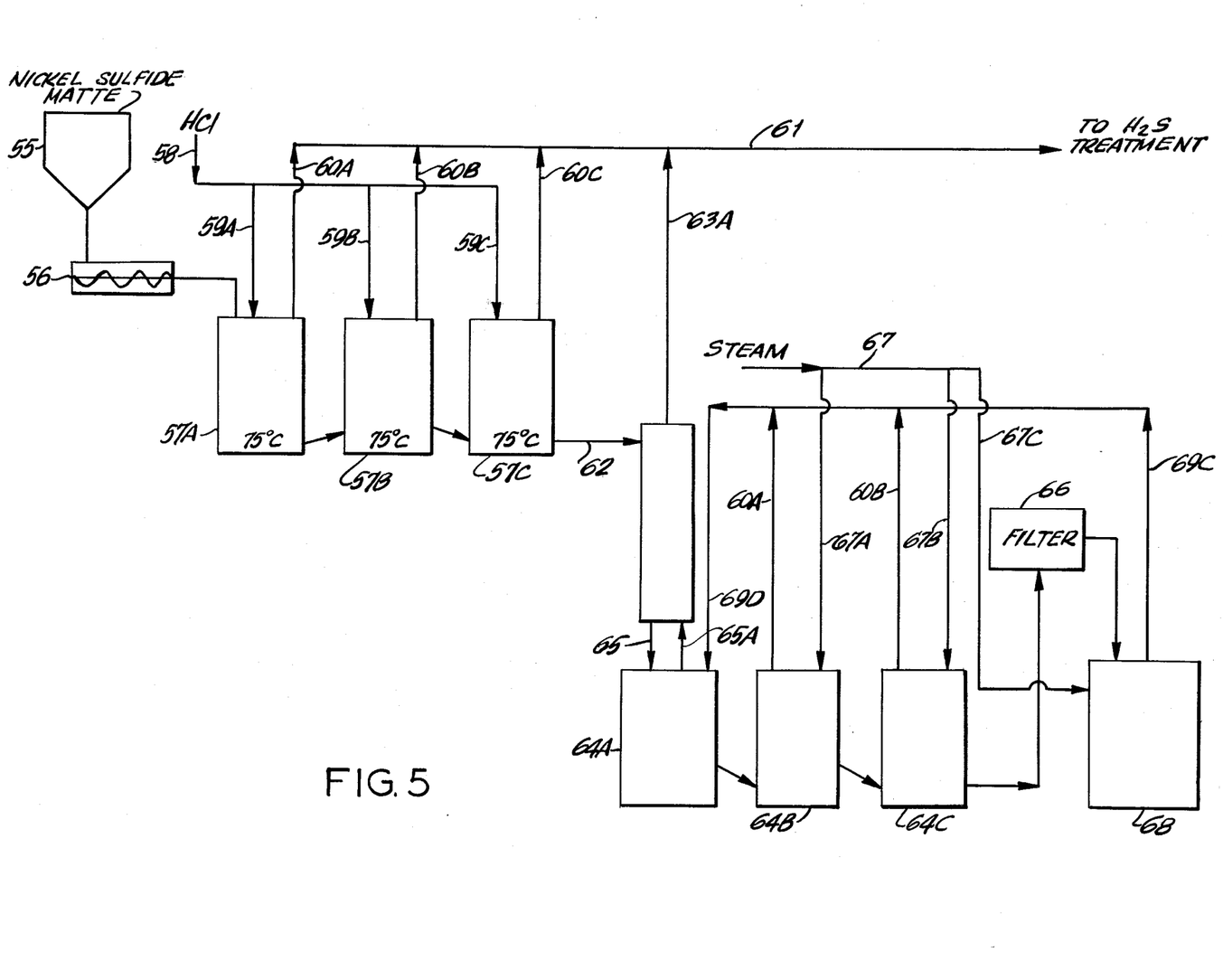
FIG. 5 is illustrative of another embodiment of the invention in which a multi-stage, low temperature leach is coordinated with a multi-stage, high temperature leach downstream of said low temperature leach in the hydrochloric acid leaching of nickeliferous sulfide material.

A more preferred embodiment of a flow sheet is depicted in FIG. 5 in which multiple stages of dissolution vessels are employed in each of the low and high temperature leaching steps.

By way of example, a finely divided thermally activated nickeliferous sulfide material is fed to hopper 55 and from there to screw conveyor 56 which feeds the sulfide material at a predetermined rate to low temperature dissolution vessel 57A which, together with dissolution vessels 57B and 57C, is maintained at a temperature of about 75° C.

Into each of the low temperature vessels is fed an azeotrope composition of HCl (about 6 N) starting at 58, the acid being fed via lines 59A, 59B, and 59C to corresponding vessels 57A to 57C, respectively, the amount of acid being proportioned in each vessel according to the amount of feed in each of the vessels on a per unit time basis.

As shown by the arrows between vessels, the slurry flows from vessel 57A to 57B and then to 57C. $H_2S$ and any hydrogen formed during the reaction is removed via lines 60A, 60B, and 60C into main line 61 and out to $H_2S$ treatment. The total residence time in passing through the low temperature vessels is about 3 hours during which period at least about 50% of the total nickel in the matte is dissolved, following which the slurry flows via suitable valve means via line 62 from vessel 57C into heating tower 63 where the slurry is heated to between 85° C. and boiling before the slurry enters high temperature leach vessel 64A. About 65% by weight of the total nickel is dissolved in the low temperature leach.

As stated hereinabove, the slurry in vessel 57C is heated in tower 63 to the selected temperature between 85° C. and boiling and the slurry then passed via line 65 into high temperature vessel 64A, the slurry comprising the aforementioned undissolved solids and the solution partially loaded with nickel in addition to some impurities. The $H_2S$ generated in vessel 64A leaves via line 65A and enters the heating tower and passes out through line 63A to $H_2S$ exit line 61.

After a suitable residence time in vessel 64A, e.g., about 1 hour, the slurry flows to vessel 64B and from there to vessel 64C. Steam 67 is fed to vessels 64B and 64C via lines 67A and 67B and gaseous products (e.g., $H_2S$, etc.) removed via lines 69A and 69B.

The pregnant solution leaves vessel 64C and passes through filter 66 to remove any solids present and the solution then passed to hot storage tank 68. Steam from line 67 flows countercurrently into hot tank 68 and strips the solution of the remaining $H_2S$ to produce a substantially $H_2S$-free leach liquor, the steam with the stripped $H_2S$ leaving hot storage tank 68 via line 69C. About 98% or more of the thermally activated sulfide material is leached of nickel.

Since a good portion of the leaching (e.g., about 65%) takes place in the low temperature multiple stage step, the control of foaming becomes important in this part of the process in that after the leached solids reach the high temperature, they are not as active and, moreover, much less $H_2S$ is generated.

Batch tests have indicated that the rate of nickel sulfide dissolution using an azeotropic composition of HCl-water (about 6 N) at ambient pressure may be enhanced by raising the temperature, by increasing the acid-to-matte ratio, by sparging gases into the matte-acid slurry during leaching, and by using granulated sulfide material, e.g., granulated matte, as opposed to slow cooled matte. Where granulated matte is employed in the process, it is produced by contacting a stream of molten matte with a coolant, such as a water spray, or other fluid.

Intense foaming tends to occur during the early stages of dissolution due to the evolution of hydrogen sulfide, depending upon the form and particle size of the thermally activated nickeliferous sulfide material, the foaming generally subsiding after a certain period of time. Foaming intensity can be reduced by reducing the leaching temperature, by reducing the quantity of sulfide material per given volume of acid (e.g., by stage-wise addition) and by controlling agitation to minimize gas being induced in the solution.

The nickel sulfide matte employed in some of the tests was thermally activated by melting nickel sulfide precipitate produced during the course of leaching laterite ores in which the nickel and the contained cobalt are recovered as precipitated sulfides prior to the further treatment thereof. In one embodiment of the invention, the nickel sulfide precipitate was melted at about 1000° C. under oxidizing conditions, granulated, dried, and generally ground before leaching, although some leaching tests were conducted on granulated matte per se in a selected size range of below 50 mesh (U.S. Standard Seive). In producing thermally activated nickeliferous sulfide material with various sulfur contents, some nickel oxide powder additions were made to reduce the sulfur content to as low as 22% by weight. Analyses of various mattes studied are given in Table 1.

TABLE 1

| Element | No. 1 | No. 2 | No. 3 | No. 4 | No. 5 | No. 6 |
|---------|-------|-------|-------|-------|-------|-------|
| Ni | 61.6 | 61.9 | 63.0 | 63.4 | 67.0 | 71.9 |
| Co | 5.26 | 4.76 | 5.13 | 4.54 | 5.26 | 4.05 |
| S  | 29.0 | 29.2 | 29.5 | 31.4 | 26.5 | 22.0 |
| Fe | 2.02 | 0.99 | 1.15 | 0.72 | 1.01 | 0.80 |
| Cu | 0.79 | 0.48 | 0.30 | 0.15 | 0.24 | 0.38 |
| Zn | 1.03 | 0.56 | 0.79 | 0.84 | 0.78 | 0.36 |

Small amounts of silicon and carbon were present ranging up to about 0.16% silicon and up to about 0.18% carbon.

Mattes No. 3 and No. 4 were produced from the same matte except that No. 3 was granulated and No. 4 was slow cooled. The lower sulfur contents of No. 5 and No. 6 were obtained by adding nickel oxide to the melt.

X-ray diffraction patterns of each of the mattes showed the major constituent to be $Ni_3S_2$, matte No. 2 showing a minor amount of $Ni_7S_6$; matte No. 3 (granulated matte) indicating a trace of $Ni_7S_6$; the slow cooled matte No. 4 also indicating a major amount of $Ni_7S_6$. A major portion of each matte was less than 200 mesh in size.

Tests have shown that in the beginning, leaching is extremely rapid (for example, during the first ten minutes), the higher the temperature, the more rapid the leaching and, generally speaking, the more intense the foaming. Preferably, the temperature should range from about 50° C. to 80° C. in the low temperature leach, e.g., 60° C. to 70° C.

Figure 6:
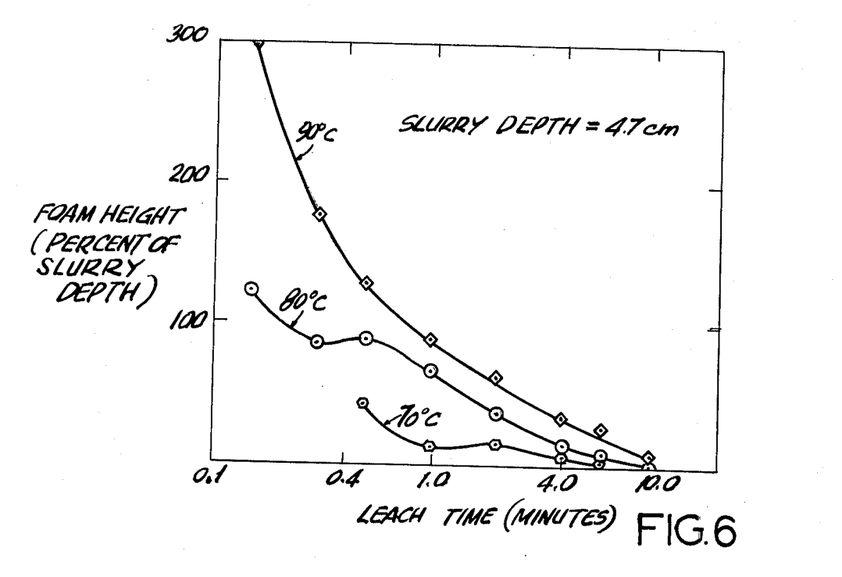
FIG. 6 depicts a series of curves showing the effect of leaching temperature and time on foam formation during leaching of highly active nickeliferous sulfide material.

As illustrative of the effect of leaching temperature on foam height during the initial part of leaching, reference is made to FIG. 6 which shows foam height as a function of time up to 10 minutes at temperatures of 70° C., 80° C., and 90° C., respectively. Matte No. 1 was leached in 300 ml of 6 N HCl as the starting normality, the amount of acid added being calculated to produce a terminal normality after dissolution of 1.88 N (this is referred to as attempted terminal acid normality).

The slurry had a depth of 4.7 cm, the amount of foaming being determined as percent of slurry depth. The solutions were agitated using a paddle impeller at a stirring rate of 400 RPM. As will be noted from the curves of FIG. 6, a temperature of 90° C. caused a foam height of over 300% almost immediately, while a more controlled foaming was obtained at 70° C. After 10 minutes of leaching, the foaming was negligible.

The effect of attempted terminal acid normality (ATAN) on foaming tendency was studied, since this is dependent on the amount of matte added. This test was conducted at 80° C. on matte No. 6 slurried in 500 ml of 6 N HCl, the amount of matte added being that amount to provide the attempted terminal acid normality. Stirring was effected at 800 RPM using a 6-blade flat impeller.

The solution calculated through matte addition to give the lowest terminal acid normality (2.02 N) showed the greatest tendency to foam immediately and to continue for over one minute; whereas, the solution with the higher attempted terminal acid normality by adding less matte, i.e., 3.31 N, showed a faster drop in foam level to between 20 and 30% of the slurry depth before one minute had passed during leaching.

Thus, to arrive at a higher terminal acid normality, less matte has to be added to the HCl solution. Thus, the foregoing test indicates that control of the amount of matte charge into the leach vessel, for example, by stage-wise addition, can be utilized to inhibit foaming during the initial dissolution reaction.

The rate of matte dissolution with HCl, e.g., 6 N HCl, can be enhanced by the removal of the $H_2S$ gas generated during leaching. This is accomplished by sparging the leach slurry with a gaseous phase, e.g., steam, air, hydrogen, or nitrogen gas.

In this connection, the leaching rate can be increased by:
(A) Increasing the flow rate of the sparge gas;
(B) Increasing the temperature as previously mentioned;
(C) Sparging directly into the slurry itself rather than in the vapor space above the slurry.

In summary, batch tests have shown that an increase in matte/acid ratio will produce a higher nickel concentration in the solution but lower percent extraction of nickel from the matte feed. This is usually accompanied by a low terminal acid normality. On the other hand, if the terminal acid concentration is higher, e.g., 1 to 2 N, the percent extraction of nickel from the matte will be higher. Generally speaking, leaching rate and foaming increase as the matte particle size is reduced by grinding. However, it has been observed that matte granulated to a small particle size tends to leach more rapidly (i.e., it is more dissolution-active) with a lesser tendency to foam as compared to comminuted matte in the same particle size range.

Foaming, on the other hand, can be reduced by 900% or more by the addition of 10 ppm of an antifoaming agent, for example, an anionic alkyl alkali metal sulfosuccinate, in this instance di(2-ethylhexyl) sodium sulfosuccinate. The amount used should preferably be less than 20 ppm and may range from about 5 to 15 ppm. The antifoaming agent may lose its effectiveness with time, for example, one hour after its use and continual additions may be necessary so long as the amount present does not exceed 15 or 20 ppm.

As stated previously, controlling the amount of nickeliferous sulfide material treated per unit volume of acid can be helpful in minimizing the amount of foaming. Thus, stage-wise addition of the thermally activated sulfide material has been found to reduce dramatically the initial foaming. The same is true for stage-wise acid addition. No overall decrease in leaching efficiency results when staged matte or staged acid addition is followed by steam sparging, although staged acid addition may not suppress foaming as much as staged matte addition.

Bath tests have also shown that low temperature leaching followed by high temperature leaching of the undigested matte solids provides high nickel extraction. For example, a series of tests using 5 N HCl showed that nickel matte could be leached adequately by maintaining the leaching temperature initially at 70° C. followed by further leaching after 1 hour by raising the temperature to boiling. After a total of 6 hours of leaching using a low temperature leach (70° C.) followed by a second high temperature leach (boiling), nickel concentrations of 105 gpl were obtained at a terminal acid concentration of 0.63 N, the amount of nickel extracted being 96.7% of the total nickel in the matte.

Further tests were conducted in which gas sparging was studied. While gas sparging has a beneficial effect on leaching rate, gas sparging, like agitation, has the concomitant disadvantage of increasing foaming during the initial stages of leaching. However, foaming can be controlled by staged matte or staged acid addition, by control of particle size or by the addition of an antifoaming agent.

The matte compositions tested are given in Table 2 below.

TABLE 2

| Matte | Chemical Composition of Mattes Tested | | | | | | |
|---|---|---|---|---|---|---|---|
| | % Ni | % Co | % Fe | % Cu | % Zn | % S | % C |
| No. 7 | 63.49 | 4.53 | 1.42 | 0.231 | 1.16 | 29.72 | 0.120 |
| No. 8 | 60.29 | 5.24 | 1.93 | 0.154 | 1.06 | 28.22 | — |

The Ni+Co+S content of matte No. 7 is 97.74% by weight; whereas, matte No. 8 showed a Ni+Co+S content of about 94.75%. Microscopic analysis of matte No. 8 appeared to indicate that this matte may have been more slowly cooled than matte No. 7 as the No. 8 matte particles were coarsely bladed. A mineralogical examination of the mattes showed $Ni_3S_2$ to be present in major amounts, while trace to minor amounts of $Ni_7S_6$ and NiS were indicated.

Matte No. 7 was in the granulated form and was gound to a particle size distribution of below 200 mesh (U.S. Standard). Matte No. 8 was prepared to provide a coarser particle size. After matte No. 8 was granulated, the minus 100 mesh size was removed and the remaining $-8+100$ mesh material was ground stage-wise to a size of $-100$ mesh and both $-100$ mesh fractions were then combined.

The particle size distribution of the mattes tested are set forth in Table 3.

TABLE 3

Particle Size Distribution of Mattes Tested (Percent by Weight)

| Mesh Size | MATTE NO. 8 Unground Matte | MATTE NO. 8 Ground Matte | MATTE NO. 8 Combined Matte | MATTE NO. 7 Granulated and Ground |
|---|---|---|---|---|
| $-100 + 150$ | 15.45 | 10.50 | 25.95 | 0 |
| $-150 + 200$ | 9.40 | 17.06 | 26.46 | 0 |
| $-200 + 270$ | 5.90 | 10.07 | 15.97 | 12.34 |
| $-270 + 325$ | 2.21 | 7.29 | 9.50 | 12.42 |
| $-325 + 400$ | 0.37 | 2.78 | 3.15 | 8.41 |
| $-400$ | 0.00 | 18.97 | 18.97 | 66.83 |
| TOTAL: | 33.33 | 66.67 | 100.00 | 100.00 |

The leaching tests were carried out in 500 ml of 6 N HCl solution, the amount of matte added being determined by the amount of attempted terminal acid normality desired (ATAN), assuming substantially complete dissolution of the matte during the leaching runs based on the sulfur and nickel removed.

In the case of matte No. 7, one test was conducted at 70° C. without a sparge gas at a stirring rate of 800 RPM for a total leach time of 3 hours. No anti-foaming agents were used. The amount of matte added was based on achieving an attempted terminal acid normality of 1.98. The actual terminal acid normality achieved was 2.64 which corrected for water loss was actually 2.18. The unleached matte excluding splash on the walls of the vessel was 14.73% of the feed, the unleached matte including splash being about 16.73 of the total feed.

However, the same run repeated using air as a sparging gas fed at a rate of 700 ml/minute into the solution to produce an attempted terminal acid normality of about 1.98 as above resulted in a terminal acid normality of 2.01 which corrected for water loss came to 1.99 N.

The unleached matte excluding splash on the walls was 2.14%, the unleached matte including the splash being about 3.59%.

A similar 3-hour leaching test conducted at 68° C. employed $N_2$ as a sparging gas, the gas being fed at 700 ml/minute. The attempted terminal acid normality was predetermined at 1.98. Upon completion of the leaching, the terminal acid normality was 2.15 which corrected for water loss came to 2.0. The percent unleached matte excluding splash on the walls of the container came to 1.51%, the total matte residue including splash coming to 3.5%. Similar results were obtained using hydrogen as a sparging gas.

EFFECT OF GAS SPARGING

As has been previously stated, gas sparging increases the rate at which nickel matte is leached with hydrochloric acid. Based on tests similar to those described hereinabove, various sparging gases were tried in matte No. 8 under similar conditions. The results are shown in FIG. 7 which compares no sparging with sparging gases air, $N_2$, $N_2$, and $H_2S$ over a leaching period of 6 hours. The lack of leaching rate enhancement by $H_2S$ sparging indicates this gas, which is a product of the reaction, to be a reaction inhibitor.

While air appears superior to the other gases, it is preferred not to use it where substantial hydrogen evolution occurs during the reaction. Steam is particularly useful as a gaseous sparging material or fluid. Steam can be particularly advantageous in the situation where it is generated in situ by boiling the solution during the high temperature dissolution stage. In this manner, the $H_2S$ can be removed as it forms to increase the dissolution rate of the nickel matte.

The effect of sparge gas on foaming will be apparent from the following table:

TABLE 4

Effect of Sparge Gas on Foaming

| Feed Matte | Sparge Gas | Flow rate ml/min | ATAN* | Foam Height (cm) After 3 min | 5 min | 10 min | 20 min | End of Test |
|---|---|---|---|---|---|---|---|---|
| No. 8 | Air | 700 | 2.10 | 0.7 | 0.45 | 1.0 | 0.8 | 0.9 |
| No. 8 | $H_2$ | 700 | 2.10 | 0.5 | 0.45 | 0.4 | 0.2 | 0.2 to 0 |
| No. 8 | $N_2$ | 700 | 2.10 | 0.6 | 0.4 | 0.2 | 0.2 to 0 | 0.2 to 0 |
| No. 7 | Air | 2500 | 1.98 | 6.4 | 6.5 | 6.4 | 6.4 | 5 |
| No. 7 | $H_2$ | 2500 | 1.98 | 5.6 | 3.5 | 2.0 | 1.1 | 1.2 |
| No. 7 | Air | 700 | 1.98 | 4.0 | 2.4 | 2.1 | 1.1 | 0.3 |
| No. 7 | $H_2S$ | 700 | 1.98 | 2.0 | 0.9 | 0.6 | 0.3 | 0.1 |

*ATAN is defined as the leach liquor acid normality resulting from complete matte dissolution as calculated on the basis of the metal concentrations in the matte feed, quantity of matte feed, and volume of 6N hydrochloric acid used.

The rate of leaching of the nickel matte No. 7 was found to be significantly affected by flow rate, particularly where air is used as the sparging gas. For example, during the first hour of leaching of a 3-hour leach cycle, at a leaching temperature of about 70° C., no sparging resulted in a nickel extraction of approximately 70% by weight, while air-sparging at 100 ml/minute resulted in 80% dissolution. By contrast, air-sparging at 700 ml/minute and 2750 ml/minute resulted in percent nickel leached of about 90% and 95%, respectively.

Tests also showed that air-sparging was more sensitive to foaming than sparging with $H_2$. Gas sweeping of hydrogen over the leach slurry is effective in reducing the partial pressure of $H_2S$ and hence in enhancing the leaching rate. In cases of severe foaming, this technique may permit high leaching rates without creating the extra foaming caused by sparging.

The effect of flowing hydrogen over the reacting slurry will be apparent by referring to Table 5 below wherein matte No. 7 was leached at 70° C. using $H_2$ gas flow at a rate of 2100 ml/minute and an attempted terminal acid normality of 1.98 (ATAN).

TABLE 5

| Test Condition | Percent Matte Unleached After Two Hours |
| --- | --- |
| No Sparge | 19.65% |
| Gas Flowing Over Slurry | 6.12% |
| Gas Sparged Into Slurry | 1.24% |

Hydrogen gas flowing over the slurry does affect beneficially the leaching efficiency, $H_2$ sparging into the slurry being more effective.

Using the same conditions as above, a beneficial effect was also obtained by raising the temperature together with the use of hydrogen flow (2100 ml/minute) over the slurry. This is shown in Table 6.

TABLE 6

| Temperature °C. | | Percent Matte Unleached After Two Hours |
| --- | --- | --- |
| During First 30 minutes | From 30 to 120 minutes | |
| 70° | 70° | 6.12 |
| 70° | 80° | 3.73 |
| 70° | 90° | 1.30 |
| 70° | 95° | 0.36 | effect substantially complete dissolution on the matte The steam can be recycle steam from various parts of the process.

EFFECT OF TERMINAL ACID NORMALITY

As stated earlier, the percentage nickel leached can be increased by increasing the attempted terminal acid normality (ATAN), although this may work at the expense of lower nickel concentration in the final solution. However, a compromise can be achieved by working over a range of ATAN of about 1 to 2 N, although the range may extend from 0.5 to 3 N ATAN.

The results with matte No. 7 leached at about 70° C. for 3 hours will be apparent from Table 7.

TABLE 7

| Effect of ATAN on Leaching Matte No. 7 For Three Hours at 70° C. With Air Sparging at 700 ml/min | | | | |
| --- | --- | --- | --- | --- |
| Test No. | ATAN | Percent Ni Leached | GPL Ni (Corrected for Water Loss) | Terminal Acid Normality Achieved (Corrected for Water Loss) |
| 1A | 0.47 | 96.0 | 138 | 0.74 |
| 1B | 0.98 | 97.2 | 129 | 1.03 |
| 1C | 1.98 | 99.0 | 116 | 2.18 |

Similar results with matte No. 8 using hydrogen sparging are set forth in Table 8.

TABLE 8

| | | Effect of ATAN on leaching of Matte No. 8 With Hydrogen Sparging at 675 ml/min and 70° C. | | | | | | |
| --- | --- | --- | --- | --- | --- | --- | --- | --- |
| Test No. | ATAN | Percent Nickel Leached After | | | | | | |
| | | 10 min | 20 min | 35 min | 60 min | 120 min | 240 min | 360 min |
| 2A | −2.00* | 22 | 30 | 37 | 45 | 54 | 64 | 67 |
| 2B | 0.63 | 30 | 38 | 47 | 56 | 70 | 83 | 84 |
| 2C | 1.12 | 31 | 41 | 53 | 63 | 78 | 82 | 89 |
| 2D | 2.10 | 32 | 44 | 55 | 66 | 77 | 86 | 94 |
| 2E | 2.10 | 33 | 44 | 59 | 69 | 84 | 90 | 94 |
| 2F | 3.07 | 38 | 50 | 62 | 70 | 83 | 96 | 98 |
| Test No. | ATAN | GPL Nickel (Corrected for Water Loss) | | | | | | Final Acid Normality (Corrected for Water Loss) |
| | | 10 Min | 20 Min | 35 Min | 60 Min | 120 Min | 240 Min | 360 Min | |
| 2A | −2.00* | 46 | 63 | 76 | 92 | 111 | 131 | 137 | 0.69 |
| 2B | 0.63 | 46 | 58 | 72 | 86 | 107 | 127 | 128 | 1.19 |
| 2C | 1.12 | 44 | 58 | 74 | 88 | 110 | 115 | 124 | 1.33 |
| 2D | 2.10 | 36 | 49 | 62 | 74 | 86 | 97 | 105 | 2.02 |
| 2E | 2.10 | 37 | 50 | 66 | 77 | 94 | 100 | 105 | 2.05 |
| 2F | 3.07 | 32 | 42 | 53 | 60 | 71 | 81 | 83 | 2.73 |

*¼ Excess Matte at Start of Test Over Stoichiometric Amounts.

STEAM SPARGING

Steam sparging was found to be effective. However, because of the relatively high temperatures required in the leach solution to avoid steam condensation, foaming at the high temperature became a problem.

This was minimized by first leaching the matte for one hour at 70° C. and then heating the partially treated slurry to boiling. A high continuous heat input sustained vigorous boiling which served to provide the effects of steam spraying accompanied by enhanced leaching rate.

It was observed that steam sparging after 1 hour at the low temperature leach (70° C.) caused more nickel to be leached than when using hydrogen sparging at 70° C. Thus, a two-stage leaching process would be advantageous, a low temperature leach at 50° C. to 80° C. followed by a high temperature at 85° C. to boiling to As will be noted from the table, nickel concentration increases as the ATAN decreases. For example, after 10 minutes of leaching at 1.12 ATAN 44 gpl Ni is present in solution whereas only 36 gpl Ni is present for 2.10 ATAN. Clearly an increase in the matte/acid ratio results in higher solution Ni concentration at any time throughout a batch leaching operation and a decrease in the terminal normality of the solution.

EFFECT OF PARTICLE SIZE BEFORE AND AFTER GRINDING

The effect of ground and unground matte on the leaching characteristics was studied for granulated matte No. 8. The granulated matte was screened through 100 mesh and an oversize fraction of −8+100 mesh obtained which was ground stage-wise until 99% passed 100 mesh and a ground fraction obtained by screening of size corresponding to −200+270 mesh.

The unground −100 mesh fraction was similarly seived to provide a size fraction corresponding to −200+270 mesh.

Figure 8:
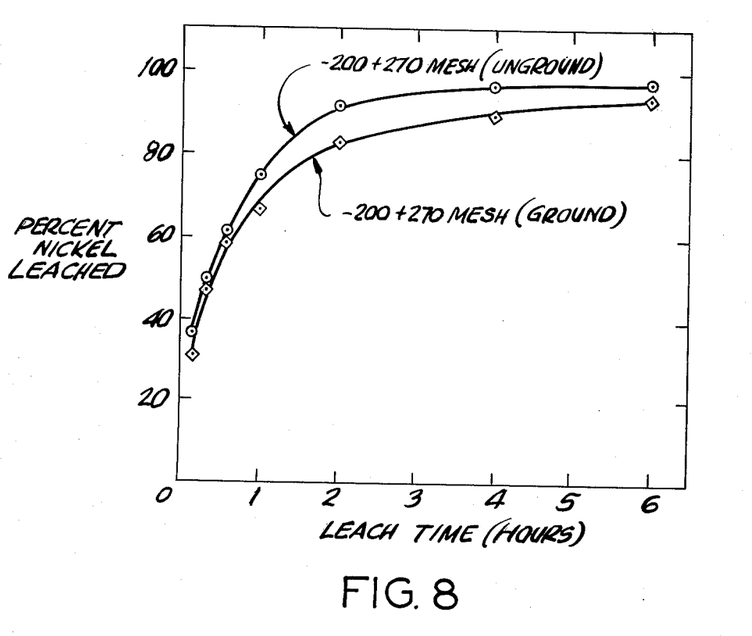
FIG. 8 depicts curves showing the effect of ground and unground granulated matte on leaching efficiency of nickeliferous sulfide material produced from melted nickel sulfide precipitate.

Both of the −200+270 mesh fractions were leached at about 70° C. at a stirring rate of 700 RPM in 6 N HCl for 6 hours while sparging with hydrogen at a feed rate of 675 ml/minute. The results are depicted in FIG. 8 which shows that direct granulation into smaller particle size improved leachability. The same results were not obtained by grinding matte granules to the same size as the unground matte.

The effect of grinding to smaller particle sizes is shown in Table 9 in which matte No. 8 was leached at 70° C. in 6 N HCl at an attempted terminal acid normality of 2.10 while sparging with hydrogen at a rate of 675 ml/minute.

TABLE 9

Effect of Particle Size Before and After Grinding on Matte Leachability
(Matte No. 8 2.10 ATAN 70° C. Hydrogen Sparge 675 ml/min.)

| Test Number | Mesh Size Prior to Grinding | | Mesh size Leached | | Percent Matte Leached After Six Hours |
|---|---|---|---|---|---|
| 3A | −8 | +100 | −100 | +150 | 87.6 |
| 3B | −8 | +100 | −200 | +270 | 94.0 |
| 3C | −8 | +100 | −325 | +400 | 95.6 |
| 3D | −200 | +270 | −200 | +270 | 97.3 |

Despite the much finer particle size of Test 3C (ground), Test 3D exhibited the highest amount of matte dissolution of 97.3% as compared to 95.6% for 3C.

The observed effect of particle size after granulation may be related to the cooling rate. It appears that the smaller particles, cooling more rapidly during granulation, tend to have a less stable crystal structure and hence a lower resistance to leaching.

These tests have also shed some light on how foaming behavior is related to mesh size. Table 10 below shows that foaming increases as grinding increases. This may be related to a higher leaching rate (and a greater rate of gas evolution) of the finer particles. Or possibly there is a higher percentage of easily flotable material in the finer fractions.

In spite of its smaller particle size and greater leaching rate, the unground material did not foam as much as any of the ground material. It thus appears that granulation to small particle size has two benefits: a faster leaching rate and less foaming.

TABLE 10

Foam Height as Related to Mesh Size
(Matte No. 8 2.10 ATAN 70° C. Hydrogen Sparge 675 ml/min)

| Test Number | Mesh Size After Granulation | | Mesh Size After Grinding | | Foam Height After (Percent of Slurry Depth) | | | |
|---|---|---|---|---|---|---|---|---|
| | | | | | 5 min. | 10 min. | 15 min. | 20 min. |
| 3D | −200 | +270 | Same | | 3.0 | 2.8* | 2.8 | 2.8 |
| 3A | −8 | +100 | −100 | +150 | 3.9 | 2.8 | 2.8 | 2.8 |
| 3B | −8 | +100 | −200 | +270 | 7.0 | 4.2 | 2.8 | 2.8 |
| 3C | −8 | +100 | −325 | +400 | 10.8 | 7.0 | 4.2 | 2.8 |

*A foam height of 2.8 percent persisted throughout the duration of all tests because of the bubbles formed by sparging.

EFFECT OF ANTIFOAMING AGENTS

In light of the foaming problem inherent in the initial stages of matte dissolution, tests were conducted with the antifoaming agent designated hereinbefore as di(2-ethylhexyl) sodium sulfosuccinate. The agent was added in small increments to 500 ml of leach slurry maintained at 70° C. while sparging with nitrogen at 1400 ml/minute.

TABLE 11

Foam Height (cm) as a Function of Concentration of Antifoaming Agent

| | Antifoaming agent | |
|---|---|---|
| Concentration | Test A-1 | Test A-2 |
| 0 ppm | 7.0 | 7.0 |
| 1 ppm | 7.1 | 7.1 |
| 3 ppm | 4.6 | 4.5 |
| 7 ppm | 0.2 | 0.2 |
| 11 ppm | 0.01 | 0.01 |
| 15 ppm | — | — |

The results in Table 11 show that about 10 ppm di(2-ethylhexyl) sodium sulfosuccinate is sufficient to completely suppress foaming.

Further testing with the same antifoaming agent showed that leaching was not retarded when 10 ppm of the agent was used. Surprisingly, a slight leaching enhancement was observed in three separate tests employing the antifoaming agent at the 10 ppm level. However, when the concentration was raised to 20 or 40 ppm, leaching was slightly retarded. The amount of agent employed should be less than 20 ppm, e.g., 5 to 15 ppm.

Thus, the amount of antifoaming agent employed should be small but effective to substantially inhibit foaming while not adversely affecting the leaching efficiency.

EFFECT OF STAGED ACID ADDITION

Tests were conducted in which the acid addition was staged in order to reduce foaming. In one batch test, a leaching run was made in which 55% of the acid was initially added followed by the remaining 45% after thirty minutes of leaching. When compared to adding all of the acid at the beginning, the staged addition reduced the foam level from 3.3 to 1.3 cm.

However, during the first 30 minutes less nickel was leached (27% vs. 46%). Nevertheless, after the remaining acid was added and another 30 minutes had passed, the quantity of nickel leached was almost as great (44% vs. 50%). At this time, the leach slurry had been heated to boiling. After a total of 1½ hours of leaching, the total quantity of matte leached was equivalent to the test in which all of the acid was added at the start. The results of the foregoing tests show that the staged acid addition will inhibit foaming with substantially no overall decrease in leaching efficiency.

Tests were conducted in which matte No. 8 was leached starting with 6 N HCl in a series of continuous leaching reactors. The results showed that matte No. 8 was substantially completely dissolved (about 99%) in five one-hour continuous leaching reactors, using steam sparging in all but the first reactor.

It was found that foaming can be suppressed in a continuous leaching reactor by adding an antifoaming agent regardless whether the foam is generated by the evolved gases from the reactor or by sparged steam. The foam generated in the first steam sparged tank can be substantially reduced by lowering the temperature a few degrees. However, in a continuous leaching process, the antifoaming agent should be added continuously to maintain, for example, a level of approximately 10 ppm of the antifoaming agent.

CONTINUOUS LEACHING PROCESS

In carrying out the continuous leaching process, a series of five separate continuous leaching tests was conducted under the conditions shown in Table 12. One to five leaching pots or reactors were employed, each reactor being equipped with baffles and an impeller, a temperature measuring device (a thermometer), a condenser, an overflow port and, in some instances, a sparger, the reactors being referred to as Reactors A, B, C, D, and E, Reactor A being the first and Reactor E being the last in the series.

Predetermined amounts of matte were added periodically to the same reactor. The start-up was initiated batch-wise beginning with the last reactor in the leaching train. Leaching was initiated in each reactor in succession at intervals usually equal to about one-half of a reactor's retention time. The tests conducted are enumerated in Table 12 as Test Nos. C-2, C-3, C-4, C-5, and C-6.

respective volumes were measured and the dry residues weighed and analyzed.

RESULTS OF CONTINUOUS LEACHING

The amount of nickel leached in each reactor during steady-state conditions is shown in Table 13. The calculations were determined from the acid normality and the nickel concentrations in the solution of each stage.

TABLE 13

Percent Nickel Leached Based On HCl Normality and Nickel Concentration

| | | % Ni Leached | |
|---|---|---|---|
| Test No. | Reactor No. | Based On HCl Conc. | Based On Ni Conc. |
| C-2 | A | 54 | 60 |
| | B | 74 | 80 |
| C-3 | A | 44 | 48 |
| | B | 56 | 65 |
| C-4 | A | (1) | 40 |
| | B | (1) | 56 |
| C-5 | A | 37 | 34 |
| | B | 89 | 96 |
| | C | 97 | 105 |
| | D | 99 | 105 |
| | E | 98 | 101 |
| C-6 | A | 40 | 39 |
| | B | 78 | 89 |
| | C | 86 | 110 |
| | D | 95 | 114 |

(1)Data not available.

Comparison tests C-2 and C-3 show that the same quantity of matte is leached in one 50-minute pot as in two 25-minute pots. Thus, the first pot of a continuous leaching train could be made quite large to avoid the

TABLE 12

| | Test Conditions | | | | |
|---|---|---|---|---|---|
| Test No. | C-2 | C-3 | C-4 | C-5 | C-6 |
| Matte | No. 8 | No. 8 | No. 7 | No. 8 | No. 8 |
| Temp. °C. | 70° | 70° | 70° | 70°* | 70°* |
| ATAN | 2.10 | 2.10 | 2.18 | 1.63* | 1.26** |
| No. of Leaching Reactors | 2 | 2 | 2 | 5 | 4 |
| Sparge Gas | $H_2$ 1 lit/min | $H_2$ 1 lit/min | None | Steam*** | Steam*** |
| Grams Matte Feed | | | | | |
| Liter 6N HCl Added | 166.7 | 166.7 | 158.5 | 186.9** | 202.9** |
| GPL Ni Attempted | 100.5 | 100.5 | 100.6 | 112.7** | 122.3** |
| Solution Residence Times (minutes) | | | | | |
| REACTOR A | 52 | 28 | 15 | 62 | 42 |
| REACTOR B | 50 | 26 | 15 | 51 | 38 |
| REACTOR C | — | — | — | 54 | 49 |
| REACTOR D | — | — | — | 55 | 45 |
| REACTOR E | — | — | — | 84 | — |
| Interval Between Matte Additions (Minutes) | 5 | 5 | 2 | 10 | 10 |

*First leaching reactor only, remaining reactors at or near boiling temperature.
**Divide by 1.06 to obtain value when diluted with condensed steam.
***"Steam sparge" in all reactors except the first.

Tests C-5 and C-6 were operated to simulate steam sparging in all but the first reactor (A). This was effected by heating all the other reactors to boiling (about 104° C.). Heated water was pumped into Reactor B at a proper rate to simulate the diluting effects of condensing steam.

Samples of liquor were removed periodically from each reactor and were titrated with standard sodium hydroxide to determine when steady state conditions had been reached. At the end of each test, the slurry in each reactor was filtered. The leach liquor and washes were analyzed for metal concentration after each of the problems of initial foaming and, apparently, not retard the overall leaching rate.

Nearly complete matte dissolution can be obtained in a continuous leaching train as is indicated by the results of Test C-5. In this test, which employed steam sparging to 1.63 ATAN with 5 vessels, nearly 100 percent matte dissolution was obtained. Even after the fourth reactor or pot, 97 to 98 percent of the matte had been leached. In attempting to leach more matte (1.26 ATAN) Test C-6 leached 95 percent of the matte with four reactors under very similar conditions (see Table 12).

Little or no foam was noted in Tests C-2 and C-3 using matte No. 8. To observe foaming behavior, Test C-4 was run using a shorter residence time (15 minutes per reactor) and the higher foaming matte No. 7. During steady-state operation, a little over 1 cm of foam was observed in the first reactor (no sparging in this test). When 5.7 ppm of the antifoaming agent was added, the foam increased slightly and then collapsed almost completely. After 15 minutes, the foam level had risen to 0.5 cm. Additional antifoaming agent caused the foam to collapse.

In order to maintain a continuously low foam level during plant operation, it is advisable to continuously administer the antifoaming agent to the vessel or vessels requiring foam suppression. This would also avoid the initial increase of the foam level when the antifoaming agent is added batch-wise.

In Tests C-4 and C-5, the majority of the foaming occurred in Reactor B which was first to be steam-sparged. For example, in Test C-6 the foam levels typically ran 0, 3.5, 1.4, and 1.8 cm in Reactors A through D, respectively. Little or no foaming was observed in Reactor A. Thus, if steam sparging is used, most foaming will occur where the slurry is heated and the leaching rate is increased dramatically. The high foam level of Reactor B seemed to increase with time, possibly in relation to the gradual build-up of solids in this reactor. The foam level in Reaction B was reduced from 3.0 to 0.3 cm by lowering the temperature from 100.5° to 97.5° C. Also, the antifoaming agent was effective in controlling foaming.

The foam levels in Reactors C and D seemed to increase as the heat input and the boiling rate increased. However, this foam was highly unstable and collapsed immediately when boiling ceased.

Solution samples were removed periodically from the reactors. The samples were analyzed to determine when steady-state conditions had been reached.

Thus, in Reactor A, during 4 hours of leaching (C-2), the steady-state analysis for nickel was in the neighborhood of 60 gpl. Similarly, in Reactor B, the steady-state analysis for nickel during 4 hours of leaching was approximately 80 gpl. These results were obtained in the leaching of matte No. 8 at 70° C. with a hydrogen sparge at 1 liter/minute with an attempted terminal acid normality (ATAN) of 2.10. The residence times for Reactors A and B were 52 and 50 minutes, respectively.

The conditions in Test C-3 were similar to Test C-2, except that the residence times in A and B were 28 and 26 minutes, respectively, for continuous leaching of up to 2 hours. The nickel analysis in A at substantially steady-state conditions fluctuated in the neighborhood of 50 gpl, while in B, the average nickel analysis was approximately 65 gpl.

Test C-4 was carried out on matte No. 7 without sparging at 70° C. at an attempted terminal acid of 2.18 N (ATAN), the residence time in each of Reactors A and B being 15 minutes, the continuous leaching being conducted to between about 60 and 70 minutes. The steady-state analysis was approximately 40 to 45 gpl Ni for A and approximately 60 gpl Ni for B.

In Test C-5 involving five reactors, the continuous leaching of matte No. 8 was carried out for upwards of 9 hours. During the steady-state period, the normality of HCl in Reactor A (70° C.) fluctuated to between 4 and 4.5 N. In Reactor B (100° C.), the HCl normality was in the neighborhood of 2; in Reactor C (104° C.) it was about 1.65 N; and in Reactors D and E (104° C.) about 1.55 to 1.65. The residence times in each of A, B, C, D, and E were 62, 51, 54, 55, and 84 minutes, respectively. Comparable results were indicated in Test C-6 except that only four reactors were used (A, B, C, and D).

It is preferred that the dissolution of nickel matte be carried out in a system in which both the low temperature leach and the high temperature leach are each carried out in multiple stages, for example, as shown in the flow sheet of FIG. 5.

The leaching process is applicable to thermally activated nickel sulfide precipitate and particularly applicable to granulated nickel matte in either the ground and unground condition. As stated herein, the average particle size is preferably less than 50 mesh and preferably less than 100 mesh.

As stated herein, the matte is generally produced by melting nickel sulfide precipitate under oxidizing conditions which is then granulated. The sulfur content of the sulfide material, however, can vary over a relatively broad range, that is, from a S/Ni atom ratio of at least about 0.3:1 to as high as 2:1.

The nickel matte may also contain cobalt in amounts ranging upwards of about 10% by weight, the total nickel plus cobalt plus sulfur content being at least about 85% by weight and preferably at least about 90%. Thus, the nickel content in the matte may range by weight from about 55% to as high as 85%, e.g., 60 to 75%. As will be appreciated, small amounts of other elements may be present, such as Cu, Fe, Zn, etc., the total amount of these elements not exceeding by weight about 15%, copper not exceeding about 5%.

As stated hereinbefore, the starting HCl leaching solution employed in leaching the nickel matte may range in normality from about 3 to 8, e.g., 5 N to 7 N. The azeotrope composition of HCl referred to ambient pressure is preferred, e.g., approximately 6 N.

The nickel chloride solution obtained in the process may be purified by, for example, solvent extraction.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. A method for the hydrochloric acid leaching of low-copper nickeliferous sulfide material optionally containing up to about 5% copper and having a nickel, sulfur, and optionally, cobalt content of at least about 85% by weight of said material which comprises, selecting the nickeliferous sulfide material to be leached from the group consisting of:
(A) a thermally activated material having a S/Ni atom ratio of about 0.3 to 0.9,
(B) a material consisting essentially of a primary nickel sulfide precipitate having a S/Ni atom ratio of approximately 1, and
(C) a material having a S/Ni atom ratio of over 0.9, leaching said selected material in accordance with the following procedure:
(I) where the material selected is (A), the material is first leached as a slurry at a selected low dissolution temperature in the range of about 50° C. to 80° C. with an amount of hydrochloric acid solution of a selected normality in the range of a about 3 N to 8 N sufficient to dissolve at least about 50% by weight of the total nickel in said material, followed by completion of said leaching at a selected high temperature in the range of over 80° C. to boiling until a terminal free acid concentration falling in the range of about 0.5 to 5 N is reached with substantially complete dissolution of the remaining nickeliferous sulfide material, (II) where the material selected is (B), the material is leached as a slurry at a selected dissolution temperature of over 50° C. in a hydrochloric acid solution of a selected normality in the range of about 3 N to 8 N sufficient to dissolve at least about 50% of the total nickel contained in said material and provide a residue refractory to further dissolution in which the S/Ni atom ratio exceeds 1, said residue being thereafter recovered and thermally activated to reduce the sulfur content thereof at least about 10% by weight of the total sulfur content, said activated residue being thereafter leached again as aforesaid, with an amount of hydrochloric acid of selected normality ranging from about 3 N to 8 N sufficient to dissolve at least about 50% of the total nickel in said activated residue and provide a terminal free acid concentration of about 0.5 N to 5 N, (III) where the material selected is (C), it is first thermally activated to reduce the sulfur content thereof at least about 10% by weight of the total sulfur content following which the activated sulfide material is leached as a slurry at a selected dissolution temperature of over 50° C. with an amount of hydrochloric acid solution of a selected normality in the range of about 3 N to 8 N sufficient to dissolve at least about 50% of the total nickel contained in said material, and provide a terminal free acid concentration of about 0.5 N to 5 N, and thereafter collecting and purifying the resulting nickel chloride leach solution obtained.

2. The method of claim 1, wherein the selected leaching is carried out in a hydrochloric acid solution of concentration ranging from about 5 N to 7 N.

3. The method of claim 1, wherein the selected leaching is carried out to a terminal normality of about 0.5 N to 3 N.

4. A method for the hydrochloric acid leaching of low-copper nickeliferous sulfide material optionally containing up to about 5% copper and having a nickel, sulfur, and optionally, cobalt content of at least about 85% by weight of said material which comprises, selecting a thermally activated nickeliferous sulfide material to be leached having a S/Ni atom ratio of about 0.3 to 0.9, first leaching said selected material as a slurry at a selected dissolution temperature of about 50° C. to 80° C. with an amount of hydrochloric acid solution of a selected normality in the range of about 3 N to 8 N sufficient to dissolve at least about 50% by weight of the total nickel in said material, followed by completion of said leaching at a selected high temperature in the range of over 80° C. to boiling until a terminal free acid concentration of about 0.5 N to 5 N is reached with substantially complete dissolution of the remaining nickeliferous sulfide material, and thereafter collecting and purifying the resulting nickel chloride leach solution obtained.

5. The method of claim 4, wherein the leaching is carried out in a hydrochloric acid solution of concentration ranging from about 5 N to 7 N.

6. The method of claim 4, wherein the selected leaching is carried out to a terminal normality of about 0.5 N to 3 N.

7. A method for the hydrochloric acid leaching of low-copper nickeliferous sulfide material having a nickel, sulfur, and optionally, cobalt content of at least about 85% by weight of said material which comprises, selecting the nickeliferous sulfide material to be leached consisting essentially of a primary nickel sulfide precipitate having a S/Ni atom ratio of approximately 1, leaching said selected material as a slurry at a selected dissolution temperature of over 50° C. in a hydrochloric acid solution of a selected normality in the range of about 3 N to 8 N sufficient to dissolve at least about 50% of the total nickel contained in said material and provide a residue in which the S/Ni atom ratio exceeds 1, separating said residue from said acid solution and thermally activating said residue to reduce the sulfur content thereof at least about 10% by weight of the total sulfur content, leaching said activated residue again as aforesaid, and then collecting and purifying the resulting nickel chloride leach solution obtained.

8. The method of claim 7, wherein the leaching is carried out in a hydrochloric acid solution of concentration ranging from about 5 N to 7 N at a temperature ranging from about 60° C. to boiling.

9. The method of claim 8, wherein the leaching is carried out to a terminal normality ranging from about 0.5 N to 5 N.

10. The method of claim 9 wherein the selected leaching is carried out to a terminal normality of about 0.5 N to 3 N.

11. A method for the hydrochloric acid leaching of low-copper nickeliferous sulfide material optionally containing up to about 5% copper and having a nickel, sulfur, and optionally, cobalt content of at least about 85% by weight of said material which comprises, selecting the nickeliferous sulfide material to be leached having a S/Ni atom ratio of over 0.9, thermally activating said sulfide material to reduce the sulfur content thereof at least about 10% by weight of the total sulfur content, leaching said thermally activated material as a slurry at a selected dissolution temperature of over 50° C. with an amount of hydrochloric acid solution of a selected normality in the range of about 3 N to 8 N sufficient to dissolve at least about 50% by weight of the total nickel in said material, and provide a terminal free acid concentration of about 0.5 N to 5 N, and thereafter collecting and purifying the resulting nickel chloride leach solution obtained.

12. The method of claim 11, wherein the leaching is carried out in a hydrochloric acid solution of concentration ranging from about 5 N to 7 N at a temperature ranging from about 60° C.to boiling.

13. The method of claim 11, wherein the selected leaching is carried out to a terminal normality of about 0.5 N to 3 N.

14. A process of leaching thermally activated nickeliferous sulfide material having a S/Ni atom ratio ranging from about 0.3 to 0.9 which comprises, subjecting said material of average particle size of less than about 50 mesh to a low temperature acid leach at a temperature of about 50° C. to 80° C., said material being leached as a slurry in an aqueous HCl solution of normality ranging from about 3 N to 8 N to dissolve at least about 50% by weight of the total nickel in said material, and completing substantially said leaching in a high temperature acid leach at a temperature in the range of over 80° C. to boiling until a terminal normality ranging from about 0.5 to 5 is reached, thereby dissolving substantially all of the remaining nickeliferous sulfide material and providing a nickel chloride solution containing at least about 70 gpl nickel.

15. The process of claim 14, wherein the high temperature leach is completed at a terminal normality of about 0.5 to 3 N.

16. The process of claim 14, wherein the material leached has a nickel plus cobalt plus sulfur content of at least about 85% by weight.

17. The process of claim 14, wherein the nickeliferous sulfide material leached has a nickel plus cobalt plus sulfur content of at least about 90% and wherein the average particle size of the material is less than about 100 mesh.

18. The process of claim 17, wherein the nickeliferous sulfide material is nickel matte which is leached in the granulated condition with or without comminution.

19. The process of claim 14, wherein the nickeliferous sulfide material is leached under conditions to inhibit foaming by either stage-wise feeding of the material or acid during leaching or by adding a small but effective amount of an antifoaming agent.

20. The process of claim 14, wherein the slurry is sparged with a gaseous fluid during leaching to enhance the dissolution of said nickeliferous sulfide material.

21. The process of claim 20, wherein the sparging fluid is steam which is employed during the high temperature leach.

22. The process of claim 14, wherein said low temperature leach and said high temperature leach are each carried out continuously through a series of multiple stages.

23. A continuous process of leaching nickeliferous sulfide material having a S/Ni atom ratio of 0.3 to 0.9 which comprises, subjecting said material in finely divided state to a low temperature acid leach through a series of multiple stages maintained at a temperature in the range of about 50° C. to 80° C., said material being leached as a slurry in an aqueous HCl solution of normality ranging from about 3 N to 8 N to dissolve at least about 50% by weight of the total nickel in said material, and completing substantially said leaching in a high temperature acid leach through a series of multiple stages maintained at a temperature in the range of over 80° C. to boiling until a terminal normality ranging from about 0.5 to 5 is reached, thereby dissolving substantially all of the remaining nickeliferous sulfide material and providing a nickel chloride solution containing at least about 70 gpl nickel.

24. The process of claim 23, wherein the high temperature leach is completed at a terminal normality of about 0.5 to 3 N.

25. The process of claim 23, wherein the nickeliferous sulfide material leached has a nickel plus cobalt plus sulfur content of at least about 85% by weight.

26. The process of claim 23, wherein the nickeliferous sulfide material leached has a nickel plus cobalt plus sulfur content of at least about 90%, and wherein the average particle size of the material is less than about 100 mesh.

27. The process of claim 26, wherein the nickeliferous sulfide material is nickel matte which is leached in the granulated condition with or without comminution.

28. The process of claim 23, wherein the nickeliferous sulfide material is leached under conditions to inhibit foaming by either stage-wise feeding of the material or the acid during leaching or by adding a small but effective amount of an antifoaming agent.

29. The process of claim 23, wherein the slurry is sparged with a gaseous fluid during leaching to enhance the dissolution of said nickeliferous sulfide material.

30. The process of claim 29, wherein the sparging fluid is steam which is sparged into each of the stages in the high temperature leach.

31. A continuous process of leaching nickeliferous sulfide material produced by melting and granulating sulfide precipitate, said material having a nickel plus cobalt plus sulfur content of at least about 85% by weight and a sulfur content corresponding to a S/Ni atom ratio of about 0.3 to 0.9, which comprises, subjecting said granulated material of average particle size less than about 100 mesh to a low temperature acid leach through a series of multiple stages maintained at a temperature in the range of about 50° C. to 80° C., said material being leached as a slurry in an aqueous HCl solution of normality ranging from about 3 N to 8 N to dissolve at least about 50% by weight of the total nickel in said material, and completing substantially said leaching in a high temperature acid leach through a series of multiple stages maintained at a temperature in the range of over 80° C. to boiling until a terminal normality ranging from about 0.5 to 5 is reached, thereby dissolving substantially all of the remaining material and providing a solution containing at least about 70 gpl nickel, while sparging each of said high temperature stages with steam.

32. The process of claim 31, wherein the high temperature leaching is completed at a terminal normality of about 0.5 to 3 N.

33. The process of claim 31, wherein the material leached has a nickel plus cobalt plus sulfur content of at least about 90%.

34. The process of claim 31, wherein the material is leached under conditions to inhibit foaming by either stage-wise feeding the material or the acid during leaching or by adding a small but effective amount of an antifoaming agent.

35. The process of claim 31, wherein said stages of said low temperature leach are sparged with a gaseous fluid to enhance the dissolution of said nickeliferous sulfide material.

* * * * *